Patented Aug. 25, 1931

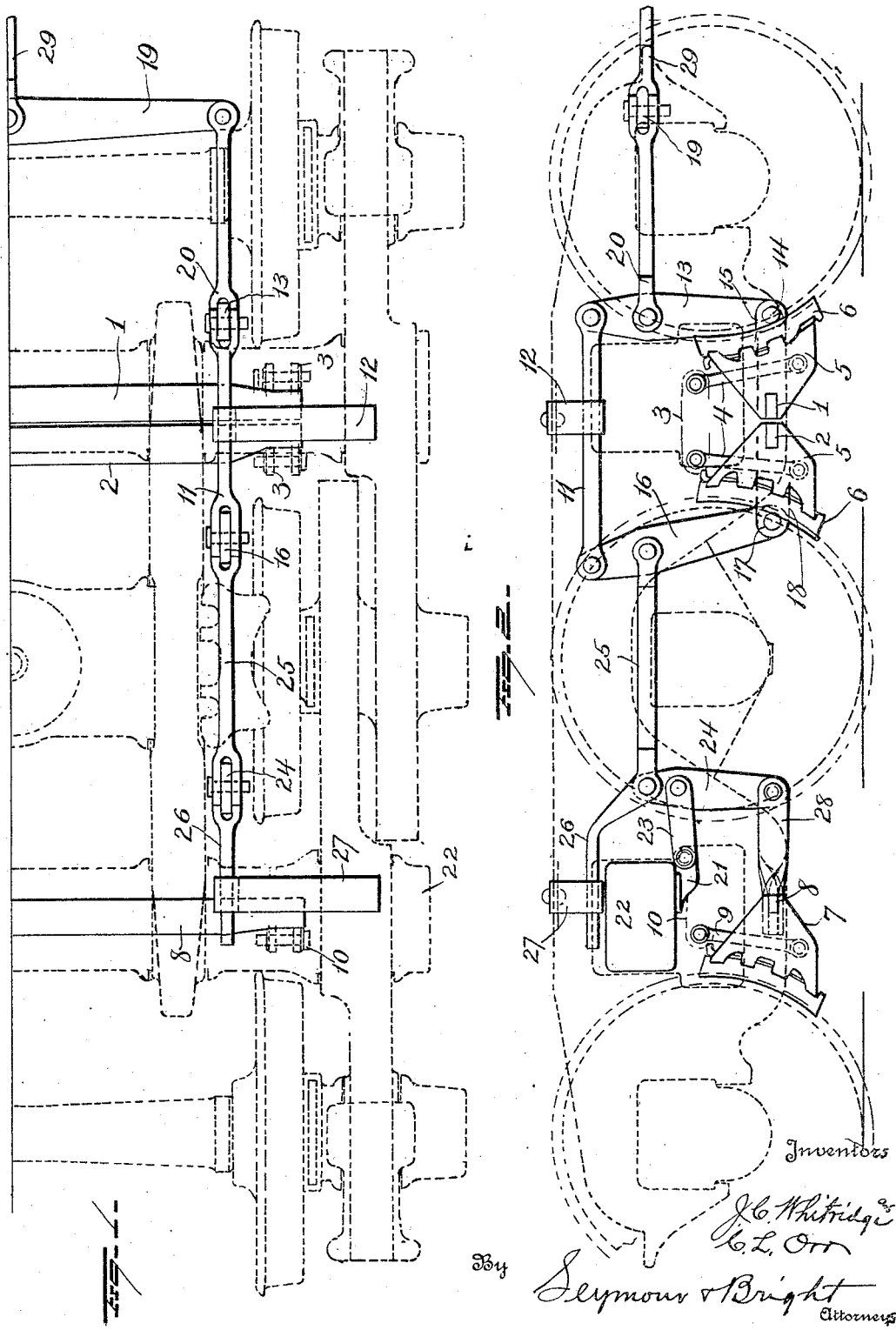

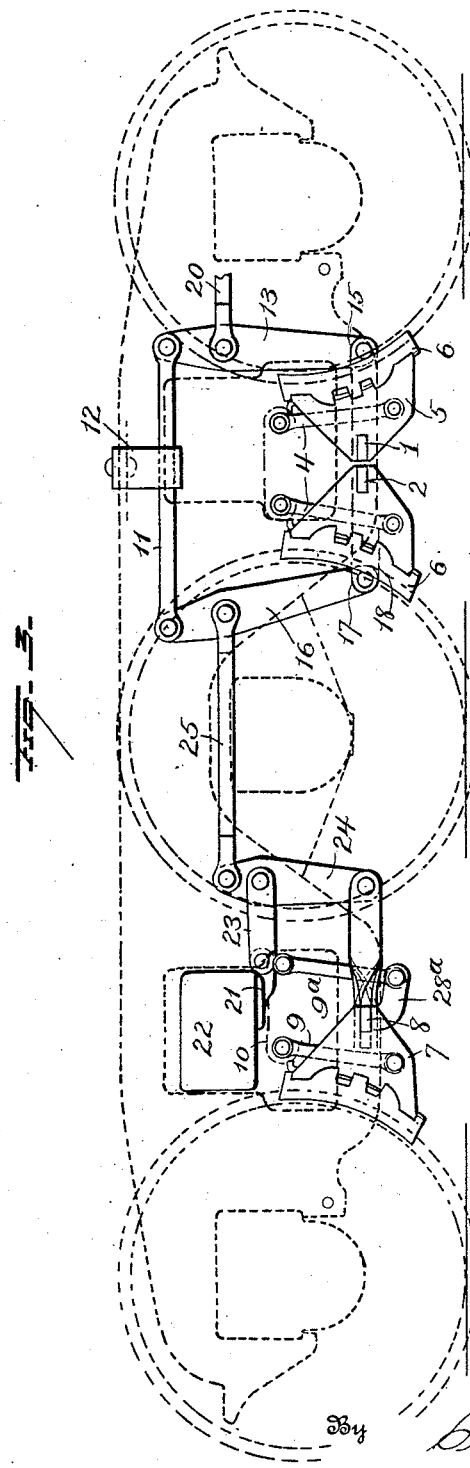

1,820,856

UNITED STATES PATENT OFFICE

JOHN C. WHITRIDGE AND CLAUDE L. ORR, OF COLUMBUS, OHIO, ASSIGNORS TO THE BUCKEYE STEEL CASTINGS COMPANY, OF COLUMBUS, OHIO

BRAKE RIGGING FOR RAILWAY CARS

Application filed January 18, 1928. Serial No. 247,632.

This invention relates to improvement in brake rigging for railway cars and particularly to such as is adaptable for use with six-wheel car trucks,—one object of the invention being to provide an improved brake rigging embodying simple and efficient improved means for suporting the brake beams and maintaining them in proper horizontal position.

With this and other objects in view, the invention consists in certain novel features of construction and combinations of parts as hereinafter set forth and pointed out in the claims.

In the accompanying drawings;

Figure 1 is a partial plan view showing an embodiment of our invention;

Figure 2 is a view in side elevation, and

Figure 3 is a view in side elevation showing another embodiment of the invention.

In the drawings, we have shown in outline, a portion of a six-wheel truck of known construction,—such for example, as that illustrated in patent to J. C. Whitridge and J. C. Larsen No. 1,415,132, May 9, 1922.

In the embodiment of the invention shown in Figures 1 and 2, the brake beams 1, 2 at the live lever end of the truck are suspended from brake hanger brackets 3 by means of brake hangers 4 pivoted at their upper ends to said brackets and pivotally attached at their lower ends to brake-shoe heads 5 (each carrying a brake shoe 6) secured to the respective brake beams 1, 2. At the dead lever end of the truck, brake shoe heads 7 secured to a brake beam 8 are connected by brake hanger 9 with the brake hanger brackets 10.

At the live lever end of the truck, a horizontally disposed, longitudinally movable rod or bar 11 is supported (one at each side portion of the truck) by a brake rod bracket 12 secured to the side frame. To one end of each bar 11, the upper end of a lever 13 is pivotally connected, the lower end of said lever being pivotally attached by a pin 14 to an arm 15 made rigid with the brake beam 1. At the other, or left hand end of the bar 11, the upper end of a lever 16 is pivotally attached to said bar, the lower end of the lever 16 being pivotally connected by a pin 17 with an arm 18 which is rigid with the brake beam 2. An equalizer beam is shown at 19 and is connected by rods 20 with the levers 13 at respective sides of the truck.

With the construction thus far described, the brake beams as well as the brake shoes 6 and their heads 5 are suspended from the brake hanger brackets through the medium of the brake hangers 4, and said brake beams are also supported and are maintained in proper horizontal positions by reason of their connection, through the arms 15 and 18, with the levers 13 and 16.

At the dead lever end of the truck, a bracket 21 is made rigid with the bolster illustrated at 22, and to said bracket 21, one end of a link 23 is pivotally connected, the other end of said link being pivoted to a lever 24, at a point somewhat below the upper end of said lever. A rod 25 is connected with the upper end of the lever 24 and with the lever 16 below the upper end of the latter. This rod 25 is provided at one end with an arm 26, a portion of which is diagonal and a portion horizontal, the horizontal portion of said arm being supported on a brake rod bracket 27 secured to the side frame. An arm 28 rigid with the brake beam 8, is pivotally attached to the lower end of the lever 24.

It will be observed that the arm 26 disposed over the bracket 27, serves to assist in supporting the brake beam 8, and the lever mechanism including the arms 28 at the dead lever end of the truck. It will of course be understood that the lever mechanism will be duplicated at the other side of the truck and it will be seen that the arms 28 will assist in maintaining the brake beam 8 in a proper horizontal position.

Braking power is applied at 29 and through the equalizer beam 19 to the live levers 13 and through the lever systems to the dead lever connection 23 fulcrumed to the bracket 21.

In the embodiment of the invention shown in Figure 3, the arm 26 and bracket 27 are omitted and two additional brake hangers 9ª (one at each side of the truck) are employed,—the brake hangers 9ª being attached at their upper ends to brake hanger brackets similar to those shown in Figure 1, and at their lower ends the hangers 9ª are attached to arms 28ª carried by the brake beam 8.

Having fully described our invention what we claim as new and desire to secure by Letters-Patent, is:—

1. In brake rigging, the combination with a six-wheel car truck, of a plurality of brake beams, brake hangers for suspending said beams, operating mechanism including a plurality of levers each connected at its lower end with one of said brake beams, a connection between the upper ends of two of the levers, a bracket on the truck slidably supporting said connection, a connection between one of said levers and a third lever, a bolster, a bracket carried by said bolster, and a link connecting said bracket and third lever.

2. In brake rigging, the combination with a six-wheel car truck, of a plurality of brake beams, brake hangers for suspending said beams, operating mechanism including two levers connected with two of said brake beams and a third lever connected with another of said brake beams, a bolster, a bracket carried by said bolster, said operating mechanism also including a connecting member between the third lever and one of the first-mentioned levers, an arm constituting an extension of said connecting member, a bracket on the truck on which said arm is mounted, and a link connecting said first mentioned bracket and third lever.

3. In brake rigging, the combination with a six-wheel truck, a bolster, a plurality of brake beams, and means for suspending said beams, of a horizontal supporting member supported by the truck, levers supported by said supporting member, arms rigid with two of said brake beams and pivotally connected with said levers, a third lever, an arm rigid with another of said brake beams and pivotally connected with said third lever, a bracket rigid with said bolster, a link connecting said bracket with the said third lever, a connecting member attached to said third lever above said link and attached to one of the first-mentioned levers below the pivotal support of the same, said connecting member having an arm, and a bracket on the truck and over the bolster and on which said last mentioned arm is supported.

4. In brake rigging, the combination with brake beams, means for suspending the same, and lever mechanism including first, second and third levers, of arms projecting from the brake beams, attached to the levers and operable to maintain the brake beams in horizontal position, and a link connecting the upper end of the third lever to the medial portion of the second lever.

5. In brake rigging, the combination with brake beams, means for suspending the same, and lever mechanism including first, second and third suspended levers, of arms projecting from the brake beams, attached to the lower ends of the levers and operable to maintain the brake beams in horizontal position, a link connecting the upper ends of the first and second levers, and a link connecting the upper end of the third lever to the medial portion of the second lever.

6. In brake rigging of the type employing a single brake shoe for each wheel, the combination with brake beams, means for suspending the same, and lever mechanism including first, second and third levers, of arms projecting from the brake beams, partially supported by the levers and operable to maintain the brake beams in horizontal position, a link connecting the upper ends of the first and second levers, a link connecting the upper end of the third lever to the medial portion of the second lever, a bolster, a bracket carried by the bolster, and a link pivotally connecting the bracket to the medial portion of the third lever.

7. In brake rigging of the type employing a single brake shoe for each wheel, the combination with brake beams, means for suspending the same, and lever mechanism including first, second and third levers, of arms projecting from the brake beams, partially supported by the levers and operable to maintain the brake beams in horizontal position, a link connecting the upper ends of the first and second levers, a link connecting the upper end of the third lever to the medial portion of the second lever, a bolster, a bracket carried by the bolster, a link pivotally connecting the bracket to the medial portion of the third lever, a suspension bracket, and an arm projecting from the second mentioned link and supported by said suspension bracket.

In testimony whereof, we have signed this specification.

JOHN C. WHITRIDGE.
CLAUDE L. ORR.